United States Patent [19]
Schroter

[11] 3,934,490
[45] Jan. 27, 1976

[54] SPRING ASSISTED VARIABLE RATIO BRAKE OPERATING LEVER SYSTEM

[76] Inventor: Hans O. Schroter, 18 Robert-Koch-Strasse, 8 Munich 22, Germany

[22] Filed: Feb. 28, 1974

[21] Appl. No.: 446,905

[30] Foreign Application Priority Data
Feb. 28, 1973 Germany............................ 2309973

[52] U.S. Cl..................................... 74/520; 74/516
[51] Int. Cl.² .......................................... G05G 1/04
[58] Field of Search ............. 74/516, 518, 517, 520, 74/110

[56] References Cited
UNITED STATES PATENTS

| | | | |
|---|---|---|---|
| 2,977,817 | 4/1961 | Panasewicz | 74/516 |
| 3,626,784 | 12/1971 | Johnson | 74/516 X |
| 3,810,400 | 5/1974 | Schroter | 74/518 |

*Primary Examiner*—Samuel Scott
*Assistant Examiner*—Frank H. McKenzie, Jr.
*Attorney, Agent, or Firm*—Edmund M. Jaskiewicz

[57] ABSTRACT

An operating lever system for the brake system of a vehicle has a rod to actuate the brake system and the rod is connected to a pivotally mounted intermediate lever. A pivotally mounted actuating lever has a roller thereon engagable with the intermediate lever. A further roller is resiliently urged against a cam surface on the intermediate lever which guides this roller substantially concentrically of the pivot mount of the intermediate lever during actuation of the rod in the braking direction and at a decreasing distance from the pivot mount upon further moving of the rod in the braking direction.

10 Claims, 3 Drawing Figures

SPRING ASSISTED VARIABLE RATIO BRAKE OPERATING LEVER SYSTEM

The present invention relates to a variable ratio operating lever system for the braking system of a vehicle, more particularly, to such an operating lever system which is spring-assisted.

The hydraulic brake system of a vehicle is operated by a master cylinder whose piston is displaced by a rod the end of which is pivotally connected to a pivotally mounted control or intermediate lever. A pivotally mounted actuating lever which may be operated by foot or manually by the operator of the vehicle applies a force to the lever, usually by a cam and roller arrangement. It is desirable that the force supplied by the operator be mechanically amplified so as to make more effective use of this force. It has also been proposed to utilize spring force to amplify the force supplied by the operator. It is generally desired that the force applied to the rod increase rapidly throughout a small initial movement of the operating lever so as to overcome any slack in the system. The force should then attain a maximum after the play in the brake operating system has been overcome and this ratio should then remain at the maximum in order to achieve the maximum brake effect in the hydraulic system.

Known variable ratio brake operators are generally unsatisfactory in that they occupy a considerable space in that part of the vehicle where space is at a premium and require considerable time by highly skilled personnel for their installation. Further, such operators should have an effective ratio which is at least as large as the average ratio that corresponds to the relationship between the maximum pivoting travel of the operating lever and the maximum travel of the piston rod of the master cylinder. However, previously known operators of this general type do not have this desirable characteristic.

It is therefore the principal object of the present invention to provide a novel and improved variable ratio operating lever system for the brake system of a vehicle.

It is a further object of the present invention to provide such an operating lever system which is spring-assisted, which is simple in structure so as to facilitate installation in a vehicle and which occupies a minimum of space.

According to one aspect of the present invention a variable ratio operating lever system for the brake system of a vehicle may comprise a rod which is adapted to actuate the brake system and a pivotally mounted actuating lever. A pivotally mounted intermediate lever is pivotally connected to the rod and is operatively engagable by the actuating lever. The intermediate lever is provided with a cam surface and roller means are resiliently urged against this cam surface so as to be guided substantially concentrically to the pivot mount of the intermediate lever during actuation of the rod in the braking direction and at a decreasing distance from the pivot mount upon further moving of the rod in the braking direction. Thus, the ratio between the distance travelled by the operating lever around its pivot and the travel of the rod initially increases and then decreases. This combined effect provides for a considerable increase in the mechanical amplification and also enables this operating lever system to be used in brake systems of vehicles having very large differences in the so-called displacement distances. Where the actuating force for the brake system is to be transmitted by a hydraulic system the operating lever system of the present invention can also be used with two separate hydraulic circuits.

The intermediate lever may be provided with two cam surfaces one of which is acted upon by a roller pivoted on the actuating lever and is convex in shape. As a result of this construction, a ratio of the travel of the actuating lever around its pivot and the travel of the rod can be selected as desired and adapted to given conditions.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
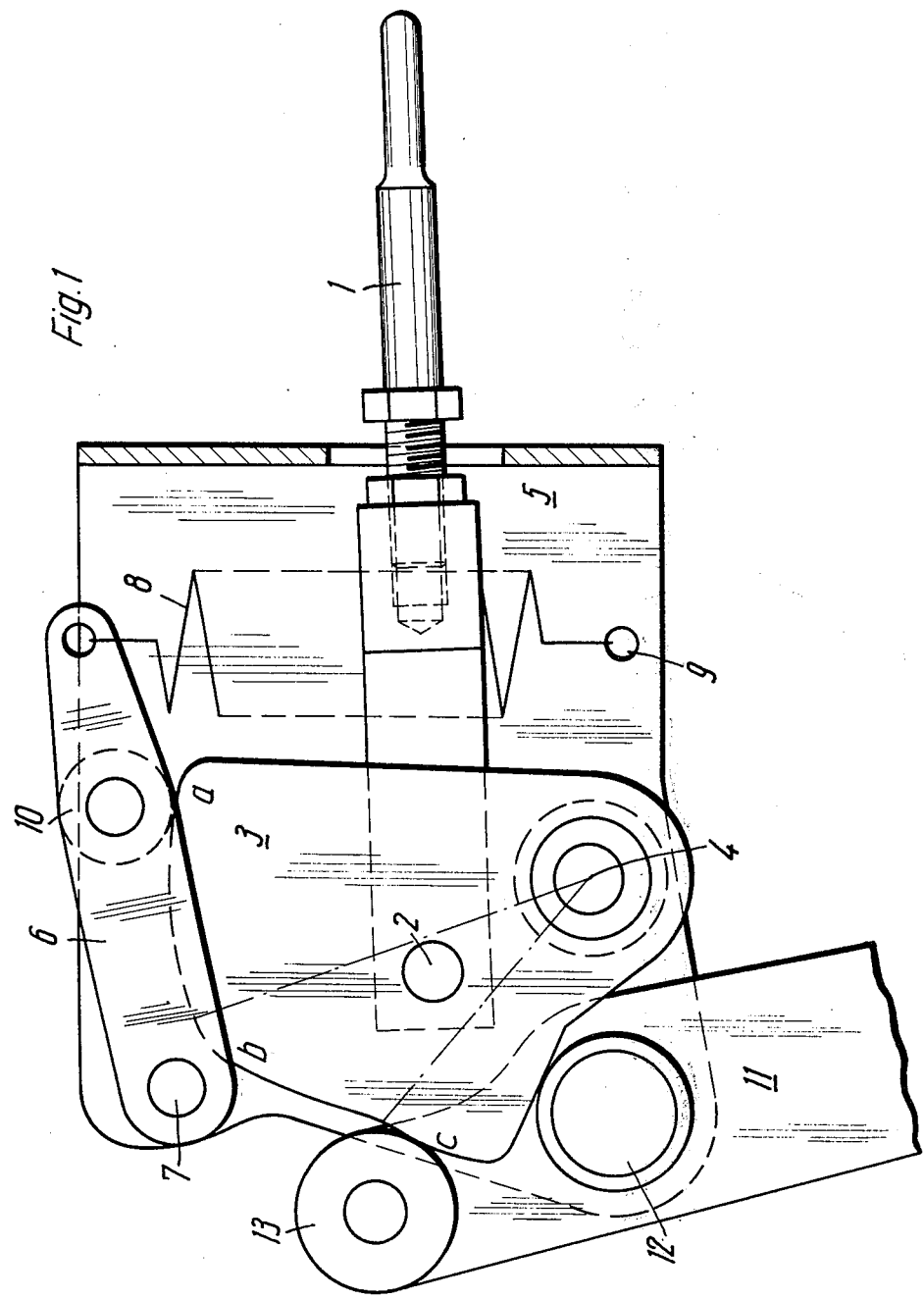
FIG. 1 is a side elevational view of an operating lever system according to the present invention with a portion thereof being shown in section.

As may be seen in FIG. 1, a brake push rod 1 acts upon a master cylinder (indicated in phantom lines in FIG. 2) as a component of a system for the hydraulic transmission of the operating force. The other end of rod 1 is connected by a pivot pin 2 to an intermediate lever 3 which is pivotally mounted about a pivot 4 in a frame 5. A lever 6 is pivoted at one end at 7 on the frame 5 and carries a roller 10. A pretensioned spring 8 is connected between the other end of lever 6 and a fixed pin 9 on frame 5 so as to urge the roller 10 against a cam surface a on the intermediate lever 3. The cam surface a is substantially concentric to the pivot 4 and continues to a second cam surface b which has a decreasing distance to the pivot point 4.

An actuating lever 11 is pivotally mounted on frame 5 at 12 and carries a roller 13 which is in contact with another cam surface c which is convex in shape. The cam path c is so shaped that the ratio of pivot travel of actuating lever 11 and the pivot travel of intermediate lever 3 is initially at a low value in the position as shown in FIG. 1 which is the release position. This ratio increases up to a maximum as the actuating lever pivots in a clockwise direction as seen in FIG. 1 and then decreases. As a result, the roller 10 will release the power of spring 8 for assisting the force of operation only after the ratio between the actuating lever 11 and rod 1 begins to decrease. The ratio of forces, i.e., the relationship between the force on brake push rod 1 and the force of actuation applied to actuating lever 11 can thus be maintained at a constant even when the displacement ratio between the actuating lever 11 and rod 1 begins to decrease after attaining its maximum value.

Two combined effects are thus obtained. The maximum value of the displacement ratio between actuating lever 11 and rod 1 can thus become larger without any increase in the total operating path of actuating lever 11 since the additional displacement required for such an increase is saved because of the decreasing displacement ratio. The spring 8 can supply a large portion of its work for assisting the force of actuation, i.e., for mechanical amplification, without the necessity of applying a force to release the brake in the case of a large lifting displacement path for the brake push rod. Namely, the spring 8 is again tensioned automatically through the force of reaction in the brake linkage 1 when the actuating force is removed.

The above described effect of spring systems in the decreasing range of the ratio is possible and can be readily produced since the resilient roller does not act directly on the actuating lever 11 but on the intermediate lever 3. If the spring 8 acted upon actuating lever 11, this would not be possible or it would be possible only with great difficulties, since the action of spring 8 on actuating lever 11 would have to be carried out with a very steep increase in force in order to compensate for the decreasing displacement ratio. However, the spring force is reduced when the spring performs work while being compressed.

The cam paths on the intermediate lever 3 are such that the beginning of the decreasing distance of the roller 10 to the pivot 4 of intermediate lever 3 occurs simultaneously. This feature enables one to obtain a constant force ratio over a longer portion of the path of actuation.

Figure 2:
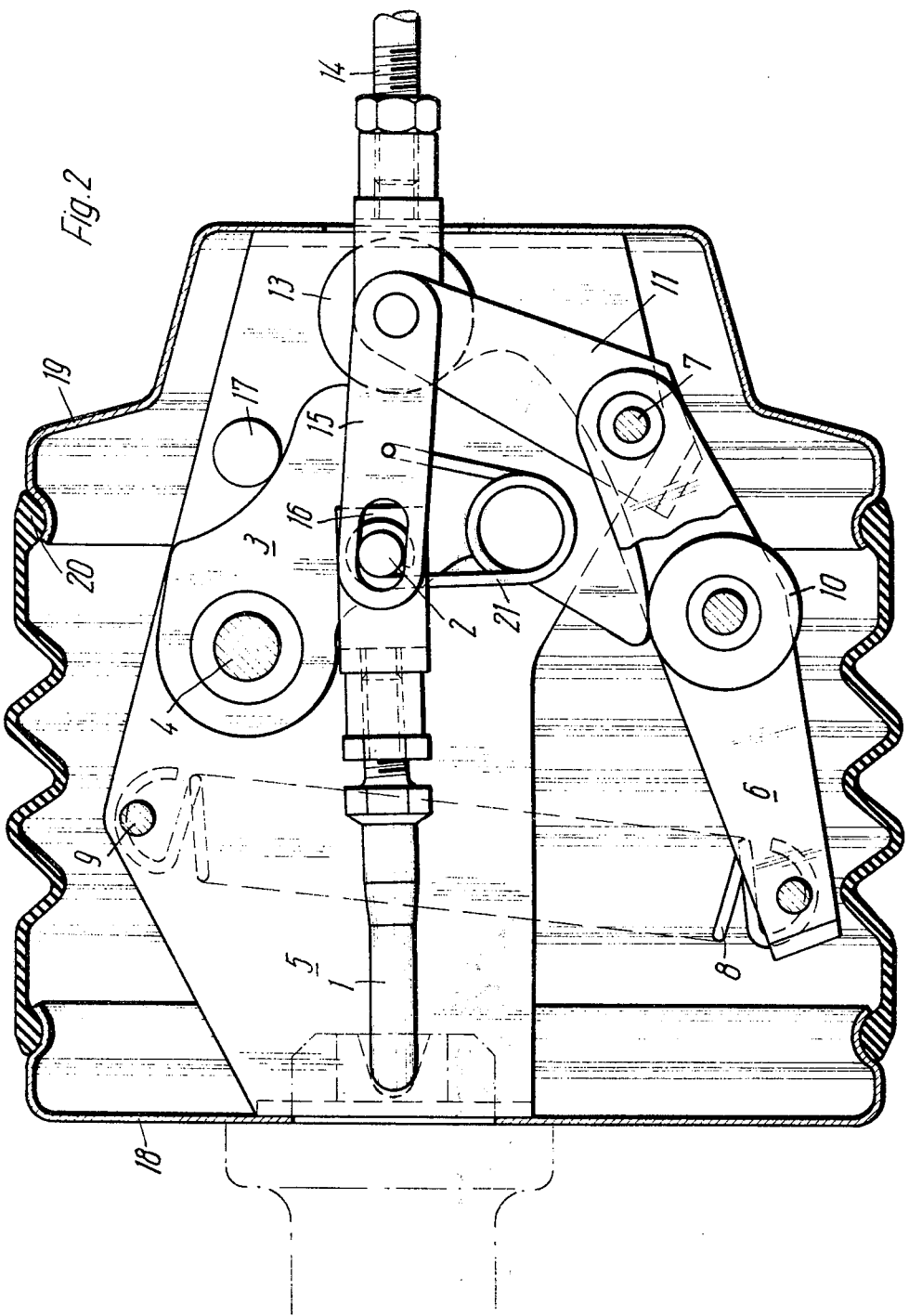
FIG. 2 is a side elevational view of a modification of the operating lever system with its enclosure being shown in section.

In the modification of FIG. 2, actuating lever 11 carrying roller 13 is pivotally mounted on the pivot pin 7 upon which the lever 6 is pivotally mounted. A linkage 14 whose length can be adjusted pivotally connects the actuating lever 11 at the pivot mount for roller 13 to a foot pedal which is not illustrated and which is actuated by the operator of the vehicle. This connection saves both structural components and costs. This modification is particularly adapted in vehicles in which the master cylinder for the hydraulic system is located at a relatively great distance from the foot pedal, such as in the engine compartment of the vehicle or behind a wall structure. In such an application, a fixed stop 17 is provided on frame 5 for limiting the pivoting movement of intermediate lever 3 in the release direction. Any tolerances between the foot pedal (not illustrated) and the pivot mount of roller 13 can thus be readily compensated during installation by means of the adjustable linkage 14.

In the release position, roller 13 which transmits the force of actuation to intermediate lever 3 always has the same point of contact with its cam path on intermediate lever 3. As a result, the same low initial ratio is always achieved. This is obtained by connecting the pivot pin 2 between rod 1 and intermediate lever 3 and the pivot pin of roller 13 by a traction plate 15 having an elongated opening 16 at its end connected with the intermediate lever 3. The traction plate 15 is pulled against intermediate lever 3 by a pretensioned spring 21 having one arm resting against pivot pin 2 and the other arm attached to traction plate 15. The roller 13 is thus maintained in the release position against intermediate lever 3 by means of traction plate 15 and the intermediate lever 3 is urged by the same force of spring 21 against fixed stop 17. This is achieved by the convex shape of the cam path for roller 13. Vibration, wear and noises are thus avoided when the brake is not operated and simultaneously in the release position the rod 1 is always held in the same relative position to the frame 5 to which the master cylinder is attached. As a result, the required clearance between the piston of the master cylinder and rod 1 can be maintained in the release position.

Spring 8 can be again placed under tension by means of traction plate 15 when the master cylinder is removed or no force of reaction is present with respect to the rod because of a lack of hydraulic fluid. In this situation, actuating lever 11 is pivoted in the release direction by means of the foot pedal by a force acting against the normal force of operation. As a result, a special tool for tensioning spring 8 is not required.

The mounting of the traction plate 15 to the pivot pin 2 and to the pivot for roller 13 eliminates the necessity of special pivot pins, reduces the manufacturing costs of the system and reduces the space required.

The frame 5 as seen in FIG. 2 consists of two U-shaped members, the open ends of which are directed toward each other and their flanges forming the ends of the frame and provided with installation bores. As seen in FIG. 2, the bores on the left are used for mounting of the master cylinder for the hydraulic system and the bores on the right end are used for attaching the operator system to a vehicle frame. Attached to the two ends of the frame 5 are cup-shaped end caps 18 and 19 whose open ends are directed toward each other. A flexible bellows 20 is mounted on the end caps to enclose their open ends and to seal the interior of the housing against dust, dirt and water. The bellows may be provided with thickened portions or lips at the ends thereof with these lips resting in annular grooves at the ends of the end plates as shown in FIG. 2. In order to adjust the rod 1, the bellows 20 can be removed from end plate 18 and compressed to permit access to the rod 1.

Figure 3:
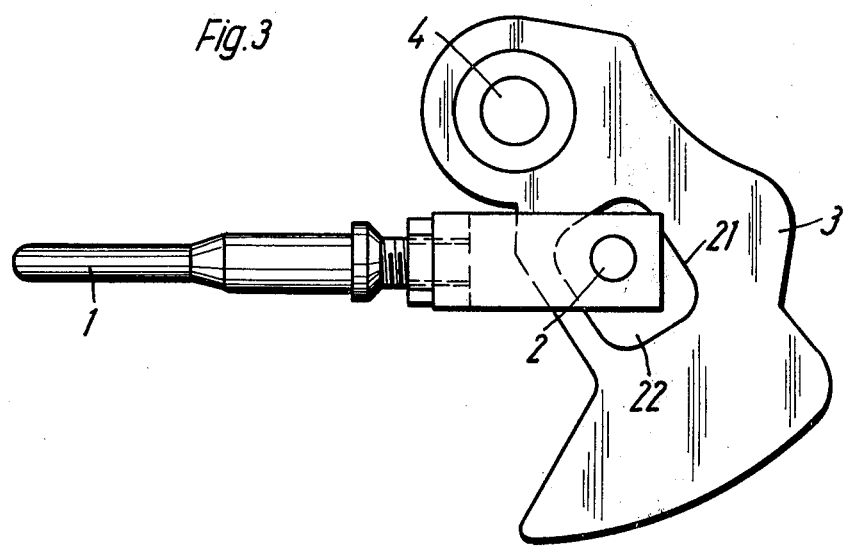
FIG. 3 is a side elevational view of the connection between the brake linkage and intermediate lever and showing and interchangeable insert for varying this connection.

The intermediate lever 3 may be provided with a slot 22 which extends substantially radially to the pivot 4 as seen in FIG. 3. The slot 22 is for the connection of rod 1 and receives an interchangeable insert 23 in which is a bore to receive the pivot pin 2 of rod 1. The insert 23 may be replaced by another insert having a different distance of the bore to pivot 4. As a result, the operating lever system can be readily adapted with a minimum of effort and expense to master cylinders having different lengths of distance stroke. The bore in insert 22 may be positioned eccentrically with respect to the insert so that two different lengths of paths of displacement of the rod 1 can be obtained merely by rotating the insert. Thus, different lengths of displacement of the rod 1 can be obtained with the same intermediate lever. Since the intermediate lever has precise cam paths for the rollers which significantly increases the cost of manufacturing the intermediate lever, the operating lever system of the invention can be adapted very economically to various master cylinders.

It will be understood that this invention is susceptible to modification in order to adapt it to different usages and conditions, and accordingly, it is desired to comprehend such modifications within this invention as may fall within the scope of the appended claims.

What is claimed is:

1. A variable ratio operating lever system for the brake system of a vehicle comprising a rod adapted to actuate the brake system, a pivotally mounted actuating lever, a pivotally mounted intermediate lever pivotally connected to said rod and engageable by said actuating lever, said intermediate lever having a cam surface, a frame, a first lever pivotally mounted on said frame, a first roller on said first lever and means for resiliently urging said first roller against said cam surface, and said first roller being guided substantially concentrically to the pivot mount of said intermediate lever at least through half of the pivoting path of the intermediate lever in the braking direction and at a decreasing distance from said pivot mount upon further actuation in the braking direction so that the ratio between the distance travelled by the actuating lever around its pivot and the travel of the rod initially increases and then decreases.

2. A variable ratio operating lever system as claimed in claim 1 wherein said intermediate lever has a second cam surface thereon convex in shape, and a second roller on said actuating lever engaging said second cam surface.

3. A variable ratio operating lever system as claimed in claim 2 wherein said cam surfaces are such that the beginning of the decreasing ratio and the beginning of the decreasing distance of said first roller to said intermediate lever pivot mount occurs simultaneously.

4. A variable ratio operating lever system as claimed in claim 1 and comprising a second lever having a pivot mount at one end thereof and said first roller being mounted thereon, said actuating lever being pivotally mounted on said second lever pivot mount, adjustable linkage means connecting said actuating lever to a brake pedal, and stop means engagable by said intermediate lever to limit its pivoting movement in the release direction.

5. A variable ratio operating lever as claimed in claim 2 wherein said linkage means is pivotally connected to the mount of said second roller on said actuating lever.

6. A variable ratio operating lever system as claimed in claim 1 and comprising a traction plate pivotally interconnecting said actuating lever and said intermediate lever, the pivot connection of said traction plate at said intermediate lever comprising a slot, and spring means urging said traction plate toward said intermediate lever.

7. A variable ratio operating lever system as claimed in claim 6 wherein said intermediate lever has a second cam surface thereon convex in shape, a second roller on said actuating lever and engaging said second cam surface, the pivot connection between said rod and said intermediate lever comprising a pin, one end of said traction plate connected to said pin and the other end thereof connected to said actuating lever second roller pivot mount.

8. A variable ratio operating lever system as claimed in claim 1 and comprising a frame comprising a pair of U-shaped members with the open ends thereof facing each other and bores in the ends of the members, end caps on the ends of said frame, and a bellows mounted on said end plates to sealingly enclose the lever system.

9. A variable ratio operating lever system as claimed in claim 1 wherein there is a radially extending slot in said intermediate lever at the pivot connection with said rod, and an interchangeable insert within said slot having a bore therethrough for a pivot pin.

10. A variable ratio operating lever system as claimed in claim 9 wherein said insert bore is eccentrically located therein so as to be eccentrically positionable within said slot.

* * * * *